United States Patent
Odate (10) Patent No.: US 7,664,585 B2
(45) Date of Patent: *Feb. 16, 2010

(54) VEHICLE SEAT BELT APPARATUS

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 11/877,163

(22) Filed: Oct. 23, 2007

(65) Prior Publication Data

US 2008/0093833 A1 Apr. 24, 2008

(30) Foreign Application Priority Data

Oct. 24, 2006 (JP) .............................. 2006-289111

(51) Int. Cl.
*B60R 22/00* (2006.01)

(52) U.S. Cl. ...................... 701/45; 701/46; 180/168; 280/735; 280/808

(58) Field of Classification Search ............... 701/45, 701/46; 180/167, 168; 280/807, 808, 735, 280/734; 318/432

See application file for complete search history.

(56) References Cited

U.S. PATENT DOCUMENTS

2005/0083000 A1* 4/2005 Specht et al. ............... 318/432

FOREIGN PATENT DOCUMENTS

JP 2003-246257 9/2003

* cited by examiner

*Primary Examiner*—Gertrude Arthur Jeanglaud
(74) *Attorney, Agent, or Firm*—Rankin, Hill & Clark LLP

(57) ABSTRACT

A seat belt apparatus includes a belt reel having a belt wound thereon, a motor for driving the reel to take up the belt; a control section for adjusting an amount of electric current supply to the motor to thereby control a belt-taking-up driving force of the motor, a current detection section for detecting the current supplied to the motor, and a rotation detection section for detecting a rotational position of the reel. The control section includes a constant current control section for executing a constant current control mode so that the current supply to the motor takes a target value, and a target current supply value change section for changing the target value when a detection signal from the rotation detection section has satisfied a predetermined condition in the constant current control mode.

16 Claims, 4 Drawing Sheets

VEHICLE SEAT BELT APPARATUS

FIELD OF THE INVENTION

The present invention relates generally to vehicle seat belt apparatus, and more particularly to an improved vehicle seat belt apparatus suited to reliably take up a seat belt without causing an excessive increase of belt tension in a constant current control mode of a motor that rotationally drives a belt reel.

BACKGROUND OF THE INVENTION

In the field of the vehicle seat belt apparatus designed to protect a vehicle occupant in a vehicle seat, there has been used in recent years a technique for, in an emergency or during unstable travel of the vehicle, holding or restraining a vehicle occupant to a seat by means of the seat belt to thereby limit a posture change of the vehicle occupant. Such vehicle seat belt apparatus are provided with an electric-type pretensioner. Generally, the electric-type pretensioner includes a belt reel provided on a seat and having wound therearound a seat belt, a motor for rotationally driving the belt reel to take up the belt, and a control section that adjusts the amount of electric power supply (or electric current supply) to the motor to control a belt take-up driving force of the motor and thereby control the tension of the belt.

One example of the prior art vehicle seat belt apparatus of the aforementioned type is disclosed in Japanese Patent Application Laid-open Publication No. 2003-246257. In the vehicle seat belt apparatus disclosed in the No. 2003-246257 publication, where the seat belt tension is controlled by the motor, appropriate seat belt control is achievable even when a target value of the seat belt tension is varied to get smaller with the seat belt tension determined only by a spring force as a result of belt-paying-out control performed to cancel gear engagement. For that purpose, a motor drive control section of the vehicle seat belt apparatus disclosed in the No. 2003-246257 publication performs control such that the electric current supply to the motor is modified to a low target level or value so that, when the seat belt has been re-paid out, due to movement, posture change or the like of the vehicle occupant, a belt-paying-out electric current of such a very low level, which will not cause the seat belt to be further paid out substantively, is supplied to the motor for a predetermined time.

With the prior art vehicle seat belt apparatus where the driving of the motor is controlled by adjusting the amount of electric power supply (and hence electric current supply) to the motor so that the belt tension takes a target tension value, there is achieved the advantageous benefit that the belt tension can be stabilized. In a case where an electric current to be supplied to the motor is controlled in a "constant current mode", the prior art vehicle seat belt apparatus would present the problem that, even when a constant electric current of an arithmetically-determined necessary value is supplied to the motor, a necessary driving force can not always be obtained due to a change in internal resistance value caused by an individual difference, aging, etc. of the motor. Namely, the belt tension obtained by the motor control would sometimes fail to take a predetermined value calculated by the control section. Particularly, in a case where a low electric current is supplied to the motor so that the vehicle occupant is restrained with an extremely small restraining force, or where slack of the seat belt is taken up gently, the performance or capability of obtaining a desired motor-driving force would greatly depend on the motor used.

SUMMARY OF THE INVENTION

In view of the foregoing prior art problems, it is an object of the present invention to provide an improved vehicle seat belt apparatus which can avoid a situation where a target driving amount can not be obtained in a constant current control mode when seat belt tension is controlled by driving of a motor, which can not only achieve stability of the seat belt tension through constant electric current control but also secure a target motor operating amount of the motor, and which can significantly enhance the comfort of the vehicle occupant when being restrained by the seat belt during minute seat belt tension adjustment.

According to an aspect of the present invention, there is provided a vehicle seat belt apparatus that includes: a belt reel having a belt wound thereon; a motor for driving the reel to take up the belt; a control section for adjusting an amount of electric current supply to the motor to thereby control a belt-taking-up driving force of the motor; a current detection section for detecting the current supplied to the motor; and a rotation detection section for detecting a rotational position of the reel. The control section includes: a constant current control section for executing a constant current control mode so that the amount of current supply to the motor takes a target value; and a target current supply value change section for changing the target value when a detection signal from the rotation detection section has satisfied a predetermined condition in the constant current control mode.

By the provision of the target current supply value change section for changing the target value when the detection signal from the rotation detection section has satisfied the predetermined condition in the constant current control mode, the present invention can achieve optimal tension of the seat belt and perform reliable seat-belt take-up operation while eliminating unwanted influences on the motor-driving amount by operational variations of the motor and resistance to the operation of the motor.

Preferably, the number of times the target value is changed by the target current supply value change section is limited. With this arrangement, a target motor-driving amount can be secured appropriately to allow the belt tension to approach a desired value, and it is possible to reduce the necessary time for the control.

Preferably, the amount through which the target value is changed by the target current supply value change section is limited. By setting such an upper limit value, it is possible to prevent excessive belt tension.

Preferably, the target current value change section has a malfunction judgment mode for, when a predetermined condition has been satisfied, judging that the motor is malfunctioning and then setting the target value of the current supply to zero.

Preferably, the control section has a test mode for causing the target current supply value change section to operate in advance by supplying a predetermined level of electric current to the motor.

According to the present invention, the seat belt apparatus, which performs the constant current control mode for adjusting the energization amount or electric current supply to the motor with a view to controlling the tension of the belt to take a predetermined value, adjusts the target electric current value into an optimal value during the constant current control. As a result, the seat belt apparatus of the present invention can not only prevent a situation where a target motor driving amount can not be obtained in the constant current control mode, but also achieve both stability in the belt tension through the constant current control and securement of a target motor driving amount. Further, the present invention can significantly enhance the comfort of the vehicle occupant when being restrained by the seat belt during minute seat belt tension adjustment.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
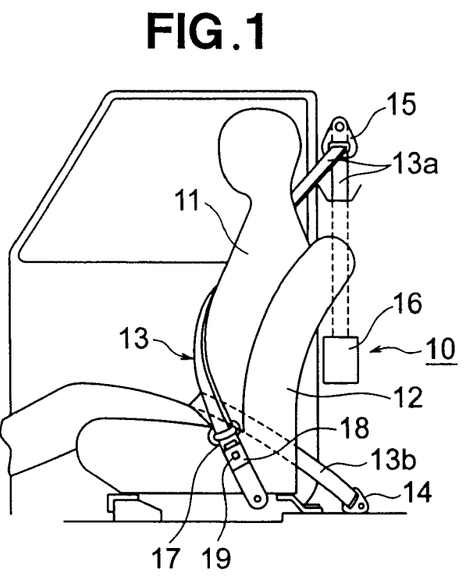
FIG. 1 is a side view of a vehicle seat belt apparatus according to an embodiment of the present invention, which particularly shows how the seat belt is attached around a vehicle occupant.
Figure 2:
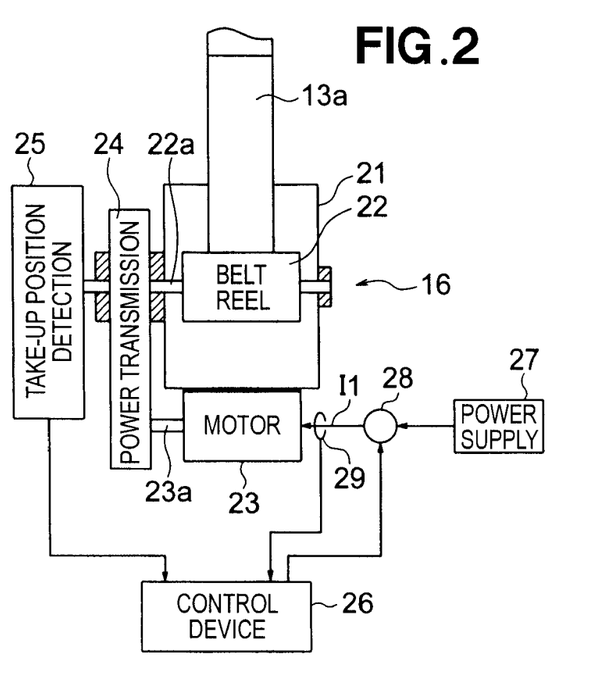
FIG. 2 is a block diagram showing an example construction of a seat belt retractor employed in the embodiment of FIG. 1.
Figure 3:
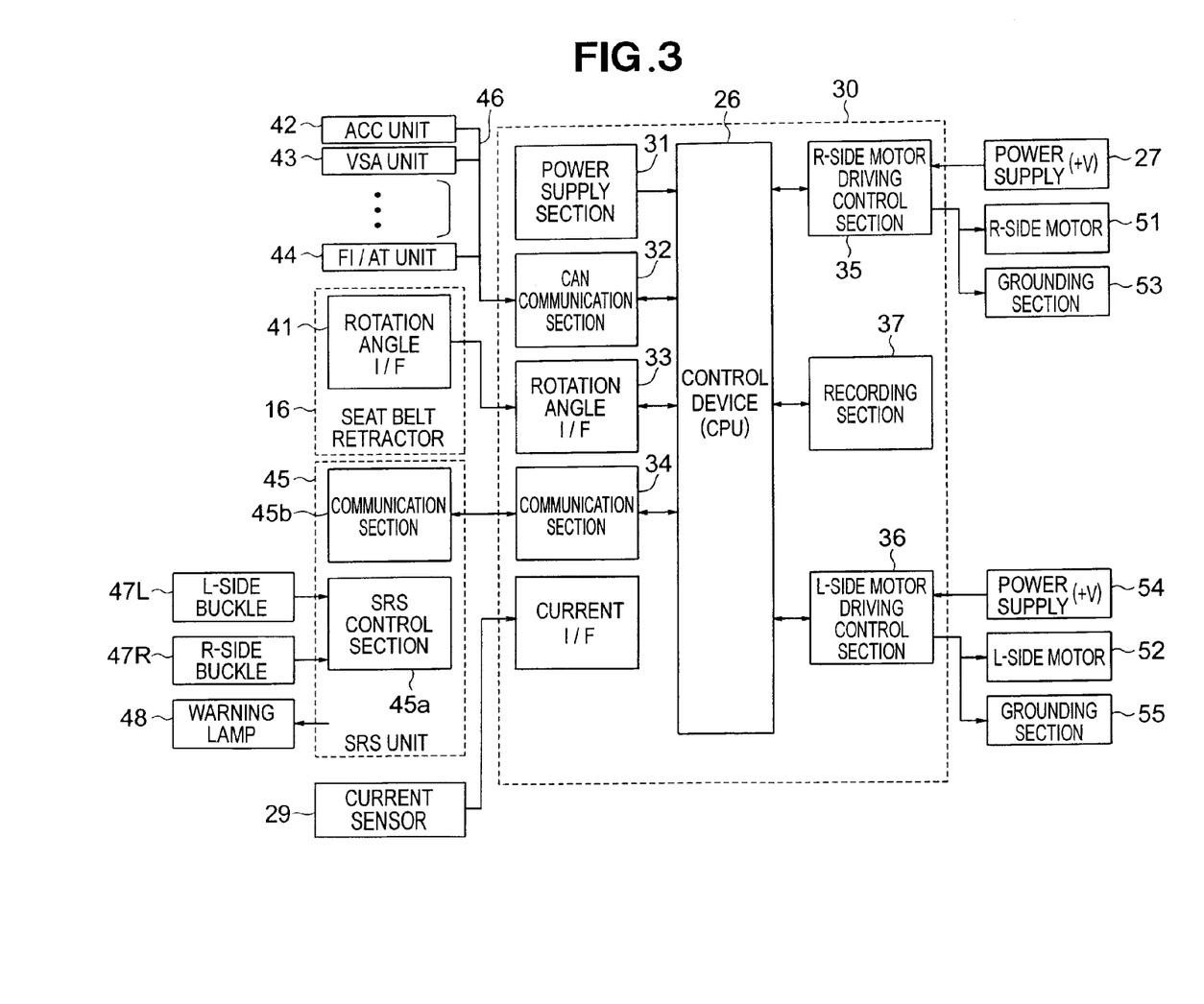
FIG. 3 is a block diagram showing a general setup of a control system of the embodiment.

FIG. 1 shows a vehicle seat belt apparatus 10 according to an embodiment of the present invention which is provided on, for example, a driver seat of a vehicle, FIG. 2 shows an example construction of a seat belt retractor employed in the embodiment, and FIG. 3 shows a general setup of the vehicle seat belt apparatus 10.

In FIG. 1, the seat belt apparatus 10 includes a belt (webbing) 13 for tying or restraining the body of a vehicle occupant 11 to a seat 12. The belt 13 includes an upper belt portion 13a for restraining an upper body portion of the vehicle occupant 11, and a lower belt portion 13b for restraining a waist portion of the vehicle occupant 11. The lower belt portion 13b is fixed at one end to a vehicle body portion, located in a lower area of a vehicle compartment, by means of an anchor plate 14. The upper belt portion 13a is folded back via a through-anchor 15 provided near the shoulder of the vehicle occupant 11, and it is connected at one end to a belt reel of the retractor 16. Tongue plate 17 is attached to a region of the belt 13 where the respective distal ends of the upper and lower belt portions 13a and lower belt portion 13 merge with each other. The tongue plate 17 is detachably attached to a buckle 18 fixed to one side of a lower seat section of the seat 12, and a buckle switch 19 for detecting connection, to the buckle 18, of the tongue plate 17 is provided on the buckle 18.

FIG. 2 shows a general configuration of primary sections of the seat belt retractor 16. The retractor 16 includes the belt reel (spindle) 22 rotatably mounted in a housing 21, and a motor 23 for rotationally driving the belt reel 22. The upper belt portion 13a is connected at the one end to the belt reel 22 as noted above, so that it is taken up by the belt reel 22. The belt reel 22 has a shaft 22a connected, via a power transmission mechanism (e.g., gear mechanism) 24, to a drive shaft 23a of the motor 23. Thus, the belt reel 22 is rotationally driven by the motor 23 via the power transmission mechanism 24. The seat belt retractor 16 also includes a take-up position detection section 25 connected to the shaft 22a of the belt reel 22.

The take-up position detection section 25 preferably comprises a rotation angle sensor that is, for example, in the form of a magnetic sensor comprising a combination of a magnetic disk and two Hall ICs. Minimum resolution of this rotation angle sensor is, for example, 4° that is in the order of about 1.3-1.6 mm in terms of the length of the seat belt. Alternatively, the take-up position detection section 25 may comprise a belt length sensor in place of the rotation angle sensor.

The take-up position detection section 25 is capable of detecting a belt take-up position or rotational position of the belt reel 22 by detecting a rotation angle of the belt reel 22 by means of the rotation angle sensor provided therein. Detection signal output from the take-up position detection section 25 is supplied to a control device 26. Rotational operation, i.e. belt take-up or belt pay-out operation, of the retractor 16 is controlled by the control device 26. More specifically, the control device 26 controls the belt take-up operation of the retractor 16 by controlling, by means of an energization amount or power supply (and hence electric current supply) adjustment section 28, an amount of a driving electric current I1 to be supplied from a power supply 27 to the motor 23.

The amount of the motor-driving electric current I1 supplied for driving the motor 23 is detected by an electric current sensor 29, and a detection signal output from the current sensor 29 is supplied to the control device 26. The control device 26 has a constant-current-control-mode control function for constantly monitoring the motor-driving electric current I1 detected by the current sensor 29 and controlling the motor-driving electric current I1 to take a predetermined target value calculated by a target current calculation section or the like, in order to generate a necessary amount of driving by the motor (hereinafter "motor driving amount").

The seat belt retractor 16, whose belt take-up operation etc. are controlled by the control device 26, is constructed as an electric-type pretensioner for holding the vehicle occupant 11 in a proper posture and position.

Whereas the vehicle seat belt apparatus 10 and retractor 16 etc., included in the seat belt apparatus 10, have been described above as provided on the driver seat, a similar seat belt apparatus 10, retractor 16, etc. are also provided on a front passenger seat. In the following description, various components provided on the driver seat will sometimes be mentioned with a prefix "R-side", while some components provided on the front passenger seat will sometimes be mentioned with a prefix "L-side.

With reference to FIG. 3, the following paragraphs describe an example general hardware setup of the control system for controlling the seat belt apparatus 10 etc.

In FIG. 3, the above-described control device 26 is in the form of a CPU. Block 30 including the control device 26, represents an electric-type pretensioner unit for allowing the vehicle occupant 11 to be held in a proper position and posture by means of the seat belt. The block 30 also includes, at an input side of the control device 26, a power supply section 31, in-vehicle network (commonly known as "CAN" or "Controller Area Network") communication section 32, rotation angle interface (I/F) section 33 and communication section 34. The block 30 also includes, at an output side of the control device 26, an R-side motor driving control section 35, L-side motor driving control section 36 and recording section 37 that is in the form of a memory storing various data, programs, etc.

Further, at an input side of the block 30, there is provided a block representing the above-mentioned seat belt retractor 16 employed in the instant embodiment. The seat belt retractor 16 includes a rotation angle interface (I/F) section 41 for transmitting the detection signal from the take-up position detection section 25 to the control device 26. The rotation angle interface section 41 is connected to the above-mentioned rotation angle interface section 33 within the block 30 and transmits the detection signal from the take-up position detection section 25 to the rotation angle interface section 33. The aforementioned seat belt retractor 16 is provided on each of the driver seat, front passenger seat, etc.

At the input side of the block 30, there are further provided an Adaptive Cruise Control (ACC) unit (i.e., unit for controlling an obstacle detection device etc.) 42, Vehicle Stability Assist (VSA) unit (i.e., vehicle behavior stability control unit) 43, Fuel Injection/Automatic Transmission (FI/AT) unit 44, Supplementary Restraint System (SRS) unit 45, vehicle traveling condition detection unit including a vehicle velocity sensor, etc. Respective output signals of the ACC unit 42, VSA unit 43, FI/AT unit 44, etc. are supplied, via an in-vehicle network 46, to the in-vehicle network communication section 32. The SRS unit 45 includes an SRS control section 45a that receives output signals from an R-side buckle 47R and L-side buckle 47L, and a communication section 45b. The R-side buckle 47R corresponds to the above-mentioned driver-seat-side buckle 18, while the L-side buckle 47L is a buckle of the seat belt apparatus provided on the front passenger seat. The respective output signals from the R-side buckle 47R and L-side buckle 47L are detection signals from buckle switches contained in the buckles 47R and 47L. Once the SRS control section 45a receives the output signal from the R-side buckle 47R or L-side buckle 47L, it transmits the received signal to the communication section 34 of the block 30 via the communication section 45b. Further, when the seat belt is not being used properly during travel of the vehicle, the SRS unit 45 gives a warning signal to a warning lamp 48.

Detection signal output from the above-mentioned current sensor 29 is supplied, as a digital signal, to the control device 26 by way of a current I/F section 38.

At an output side of the block 30, there are provided an R-side motor 51 and L-side motor 52. The R-side motor 51 is a driving motor for the driver-seat-side seat belt apparatus 10 and provided in correspondence with the R-side motor driving control section 35. The R-side motor driving control section 35 controls an amount of energization or electric power supply (electric current supply) from the above-mentioned power supply (+V) 27, on the basis of a control instruction signal given from the control device 26, to thereby supply a driving current to the R-side motor 51. Block 53 represents a grounding section. Further, the L-side motor 52 is a driving motor for the front-passenger-seat-side seat belt apparatus 10 and provided in correspondence with the L-side motor driving control section 36. The L-side motor driving control section 36 controls an amount of energization or electric power supply (electric current supply) from a power supply (+V) 54, on the basis of a control instruction signal given from the control device 26, to thereby supply a driving electric current to the L-side motor 52. Further, block 55 represents a grounding section. The grounding sections 53 and 55 are ground terminals forming part of the vehicle body.

Figure 4:
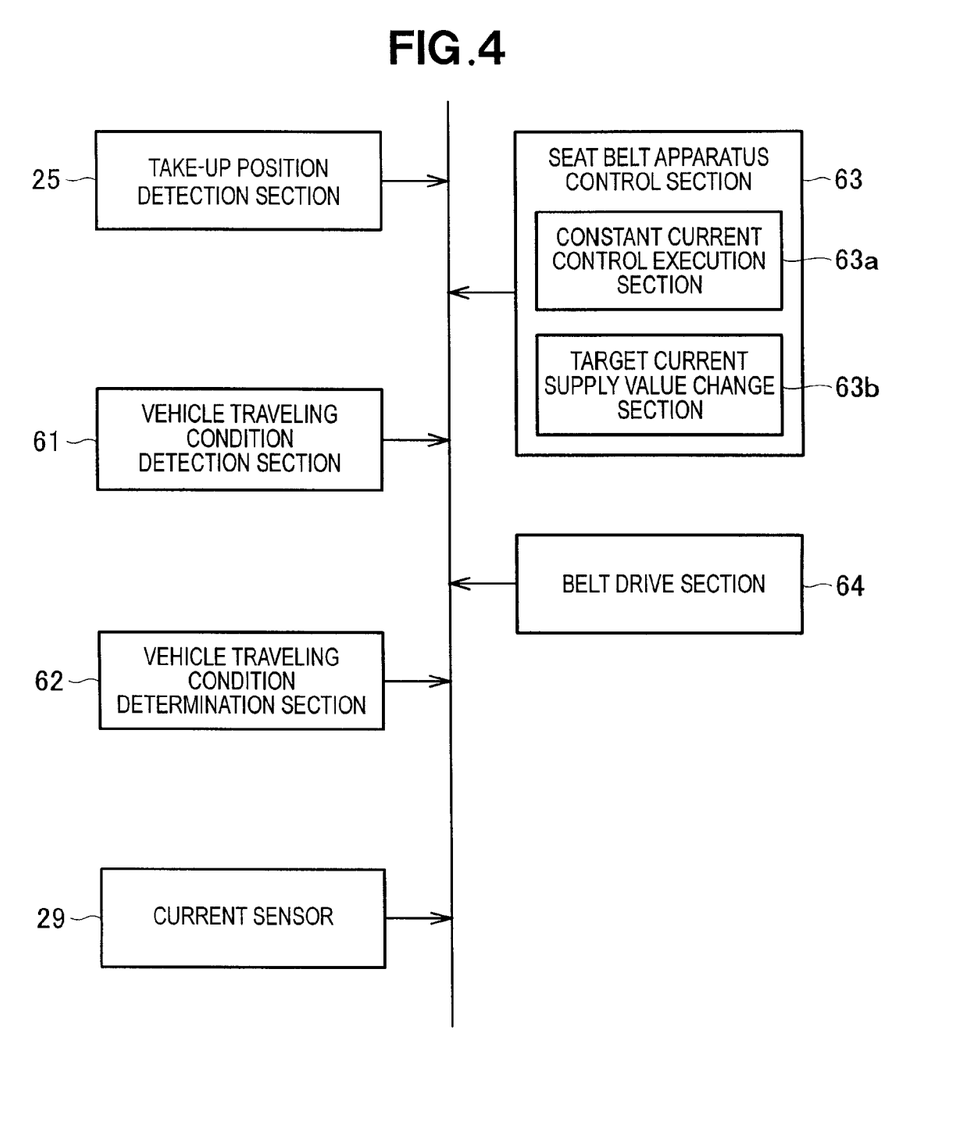
FIG. 4 is a block diagram showing an example configuration of relevant sections of the control system of the embodiment.

FIG. 4 is a functional block diagram conceptually showing an example fundamental setup of the control system for the seal belt apparatus 10 according to the instant embodiment. The control system includes, as its primary or relevant components, the aforementioned take-up position detection section 25, current sensor 29, vehicle traveling condition detection section 61, vehicle traveling condition determination section 62, seat belt apparatus control section 63 and belt drive section 64.

The vehicle traveling condition detection section 61 comprises at least one of various types of sensors, such as a front-rear acceleration sensor for detecting acceleration, in a front-rear direction, of the vehicle, left-right (i.e., lateral) acceleration sensor for detecting acceleration, in a left-right (i.e., lateral) direction), of the vehicle, vehicle velocity sensor, steering angle sensor, road wheel velocity sensor, roll angle sensor and turning angle sensor, etc.

The vehicle traveling condition determination section 62 is implemented by an arithmetic processing function of the control device (CPU) 26, which performs a determination operation on a traveling condition of the vehicle by comparing a detection signal from the vehicle traveling condition detection section 61 with a predetermined reference value.

The seat belt apparatus control section 63 is implemented by the arithmetic processing function of the control device 26 and the R-side and L-side motor driving control sections 35 and 36. The seat belt apparatus control section 63 includes, as its control function elements, a constant current control execution section 63a for executing a constant current control mode and a target power supply (current supply) value change section 63b. The belt drive section 64 corresponds to the aforementioned seat belt retractor 16, and more specifically to the R-side and L-side motors 51 and 52.

Next, with reference to a flow chart of FIG. 5, a description will be given about example control performed, by the seat belt apparatus control section 63, on the operation of the seat belt apparatus 10.

Figure 5:
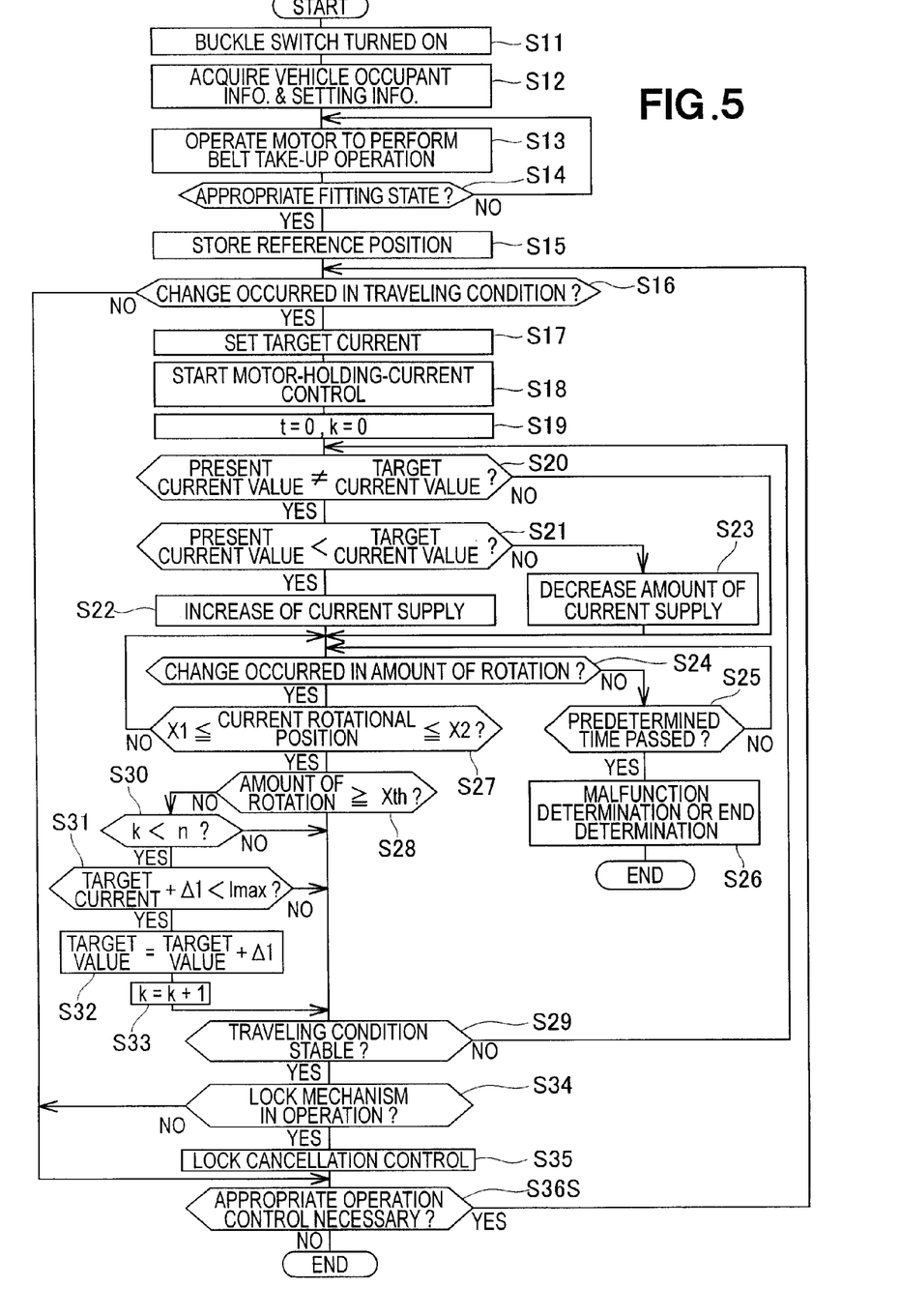
FIG. 5 is a flow chart explanatory of fundamental control of the embodiment.

FIG. 5 shows an example operation control sequence after the vehicle occupant 11 is seated in the seat 12, attaches the seat belt 13 around his or her body and then couples the tongue plate 17 to the buckle 18 so that the buckle switch 19 is turned on. The following description will be given representatively in relation to the R-side motor 51.

The seat belt 13 is attached around the vehicle occupant's body by the vehicle occupant 11 being seated in the seat 12, winding the belt 13 around the body and coupling the tongue plate 17 with the buckle 18 (R-side buckle 47R). At that time, the buckle switch 19 is turned on at step S11.

Then, in the seat belt apparatus 10 whose seat belt 13 has been attached around the vehicle occupant's body, personal information of the vehicle occupant 11 and setting information is acquired at step S12, as fundamental operation of the seat belt apparatus 10. Let it be assumed here that the vehicle occupant's personal information and setting information is prepared in advance and prestored in the recording section 37 shown in FIG. 3. The vehicle occupant's personal information includes information of the sex, body size, etc. The setting information is, for example, information set as desired by the vehicle occupant 11.

At following steps S13 and S14, the R-side motor 51 is operated, on the basis of the acquired vehicle occupant information and setting information, to cause the belt reel 22 to perform belt take-up operation (step S13) so that the seat belt tension is adjusted until an appropriate fitting (attached) state of the seat belt is attained (step S14). If a YES determination is made at step S14, a reference position of the seat belt is stored at step S15. Data indicative of such a reference position is stored into the recording section 37.

At next step S16, a determination is made as to whether there has occurred any change in the traveling condition of the vehicle. With a NO determination at step S16, control goes to step S36, while, with a YES determination at step S16, operations at and after step S17 are carried out.

The determination at step S16 is carried out on a periodical basis during the time that the vehicle is traveling and appropriate operation control on the seat belt apparatus 10 is being requested.

The determination at step S16 as to whether any change has occurred in the vehicle's traveling condition is performed primarily on the basis of detection signals from the vehicle traveling condition detection section 61 and vehicle traveling condition determination section 62. Examples of the change in the "vehicle traveling condition" include emergent situations like a side skid and sudden deceleration, and changes in normal operating states like relatively great steering operation and accelerator operation. Further, such examples of the change in the "vehicle traveling condition" may include great leftward/rightward shaking of the vehicle occupant, for example, when lateral acceleration has exceeded a predetermined level (preferably below a critical level range of 0.35-0.45 G at which a lock mechanism is activated), when steering operation exceeding a predetermined operation amount has been performed or when any of the road wheels has run idle during turning of the vehicle. Change in the aforementioned steering operation includes not only a change due to operation by the driver but also a change due to automatic steering of the vehicle and external force.

If it is determined, at step S16, that a "change has occurred in the vehicle traveling condition", a target electric current is set which corresponds to a seat-belt restraining state preset in association with the electric current change in the vehicle traveling condition (step S17). As noted above, the seat belt apparatus control section 63 includes the constant current control execution section 63a that performs control in the constant current control mode. For example, amounts of electric current to be supplied to the motor 23, i.e. R-side motor 51, are set in advance in association with various possible traveling conditions (and conditions of the vehicle occupant), and the constant current control execution section 63a sets one of the preset amounts of electric current, which corresponds to the traveling conditions, as a target electric current value.

Once the target electric current is set at step S17, a motor holding current is determined for controlling the belt taking-up operation of the R-side motor 51 so as to correspond to the set target electric current. Then, control on the motor holding current for changing the amount of the belt take-up by the R-side motor 51 is started at next step S18. Further, following the motor holding current control stat at step S18, two variables t and k are each set to "0" at step S19.

As basic operation of the seat belt apparatus 10, the R-side motor 51 is driven with a given constant power supply (electric current supply) amount, so that the upper belt portion 13a is taken up by the belt reel 22 and drawn into the seat belt retractor 16. By the given constant electric current supply to the R-side motor 51 being retained as a holding current, the amount of belt take-up by the seat belt retractor 16 is set to correspond to a desired target take-up position.

The control for setting the amount of the driving electric current supply to the R-side motor 51 (constant current control mode) is performed at steps S20-S23 shown in FIG. 5.

At step S20, a determination is made as to whether the present electric current value agrees with the target electric current value. Here, the "present electric current value" is information indicative of the present electric current supply to the motor obtained on the basis of the detection signal output from the current sensor 29. Further, the "target electric current value" is a value of the above-mentioned target electric current. With a NO determination at determination step S20, i.e. if the present electric current value and the target electric current does not value agree with each other as determined at step S20, control moves to next determination step S21 to determine which one of the "present electric current value" and "target electric current value" is greater than the other. If the "target electric current value" is greater than the "present electric current value" (present electric current value<target electric current value) (YES determination at step S21), the amount of electric current supply (I1) to the motor is increased at step S22, while, if the "target electric current value" is not greater than the "present electric current value" (NO determination at step S21), the amount of electric current supply to the motor (I1) is decreased at step S23. In this manner, the amount of electric current supply to the motor is controlled to agree with the predetermined target electric current having been set at step S17.

Following the execution of step S22 or S23, determination step S24 is executed. At step S24, a determination is made as to whether there has occurred a change in the amount of rotation of the belt reel 22, to monitor a change in the amount of rotation of the belt reel 22. The "change in the amount of rotation of the belt reel 22" means a variation over time in the amount of rotation of the belt reel 22 calculated on the basis of the detection signal output from the take-up position detection section 25. If there has occurred no change in the amount of rotation of the belt reel 22 as determined at step S24, a further determination is made, at step S25, as to whether a predetermined time has passed. With a NO determination at step S25, determination step S24 is repeated. Once the predetermined time has passed as determined at step S25, control moves on to step S26 to make a malfunction (operational failure) determination or end determination.

If there has occurred a change in the amount of rotation of the belt reel 22 as determined at determination step S24, control proceeds to determination step S27. At determination step S27, a determination is made as to whether the current rotational position of the belt reel 22 is within a predetermined range (between a lower limit X1 and an upper limit X2). Only if the current rotational position of the belt reel 22 is within the predetermined range as determined at step S27, a further determination is made, at step S28, as to whether the rotation change amount of the belt reel 22 is equal to or greater than a predetermined threshold value Xth. If the current rotational position of the belt reel 22 is not within the predetermined range (NO determination at step S27), control reverts to step S24 above. With a YES determination at step S27, control moves to step S28.

Whereas determination step S27 has been described above as making a determination based on the current rotational position of the belt reel 22, step S27 may make a determination on the basis of time information. Namely, a time threshold value Tth may be set, and the time variable set at step S19 may be compared with the threshold value Tth.

If the rotation change amount is equal to or greater than the threshold value Xth as determined at step S28, it is judged that the electric current supply (I1) to the motor has reached the target electric current value and the belt tension has reached a target value, and thus, control moves to step S29 in order to determine whether the vehicle is currently in a stable traveling condition. If the rotation change amount is smaller than the threshold value Xth as determined at step S28, it is judged that the belt tension has not reached the target value, so that control proceeds to a process (steps S30-S34) for changing the target electric current value itself having been set at step S17.

At step S30, a determination is made as to whether the variable k is smaller than a preset value n. With a YES determination at step S30, control shifts to next determination step S31, while, with a NO determination at step S30, control branches to step S29. At step S31, the target electric current is increased by a predetermined value Δ1, and a determination is made as to whether the increased target electric current is greater than an upper limit value (Imax). If, on the other hand, a YES determination has been made at step S31, control proceeds to step S32. The reason why the upper limit value (Imax) is set herein is to prevent excessive belt tension. Thus, in the seat belt apparatus where the target electric current value is changed, the target electric current change amount can be limited appropriately. For an ordinary-posture holding purpose, about 1.2-1.3 times of the initial target electric current value is used as the upper limit value Imax. Further, the predetermined value Δ1 is about 5-10% of the target electric current value. In case the belt tension has increased above target belt tension value to be applied during ordinary operation, the belt tension, in principle, is not returned to the target belt tension value until next execution of step S29. When removing slack of the belt, the upper limit Imax may be about the initial target electric current value.

At following step S32, the increased target electric current value (target electric current +Δ1) is set as a new target electric current. Then, control moves to step S33, where the variable k is increased by one, after which control goes to step S29 in order to judge a vehicle traveling condition.

If a NO determination has been made as step S31, control immediately branches to step S29. Note that, as the determination criterion set at step S28, a maximum change amount or average change amount of the belt reel rotation may be used.

If the vehicle is not in a stable traveling condition as determined at step S29, control reverts to step S20 in order to perform the afore-mentioned constant current control using the increased or new target electric current (at steps S21-S23 etc.). As long as the traveling condition of the vehicle is unstable, the target electric current value is again changed so that control is performed to allow the present target electric current value and the changed or new target electric current value to agree with each other.

In the target electric current change operations, the number of times the target electric current value can be changed may be limited, in order to reduce the necessary control time.

Unless it is determined at determination step S28 that the rotation change amount of the belt reel 22 has reached the preset amount, an expected motor-driving amount for restraining, by the seat belt, of the vehicle occupant has not yet been achieved. Thus, the execution of the afore-mentioned operations of steps S30-S33 can appropriately change the target electric current to achieve desired belt taking-up operation without excessively increasing the belt tension.

The operations of steps S30 to S33 implement the above-mentioned target current supply value change section 63b for changing the target amount of electric current supply to the motor. The target current supply value change section 63b may be constructed to have a malfunction judgment mode in which, upon satisfaction of a predetermined condition, it judges that the motor is now suffering from a malfunction and then sets the target electric current supply value to "zero".

If it has been determined at step S29 that the vehicle is currently in a stable traveling condition, control proceeds to next determination step S34, where a determination is made as to whether the lock mechanism (not shown) is currently in operation. If the lock mechanism is currently not in operation as determined at step S34, control moves on to further determination step S36 after lock cancellation control is performed at step S35. Although not specifically shown in FIG. 2, the lock mechanism is provided in association with the shaft 22a of the belt reel 22.

At step S36, a determination is made as to whether the vehicle is currently traveling and whether appropriate operation control has to be performed on the seat belt apparatus 10. With a YES determination at step S36, control reverts to step S16 in order to check a change in the traveling condition of the vehicle, while, with a NO determination at step S36, the operation control of the seat belt apparatus 10 is brought to an end.

Electric-type pretensioner using the R-side motor 51 is constructed in the above-described manner. With such an electric-type pretensioner, the vehicle occupant 11 can be held in an appropriate position and posture.

By supplying a predetermined amount of electric current to the motor under the control of the seat belt apparatus control section 63, the seat belt apparatus can be constructed to have a test mode in which the aforementioned target current supply value change section 63b is caused to operate in advance on a trial basis.

According to the operation control of the seat belt apparatus 10, as described above, the seat belt apparatus 10, which performs the constant current control mode for adjusting the energization amount or electric current supply (I1) to the motor 23 in order to control the tension of the belt 13 to take a predetermined value, adjusts, by means of the target current supply value change section 63b, the target electric current value into an optimal value during the constant current control. As a result, the seat belt apparatus 10 of the present invention can not only prevent a situation where a target motor driving amount can not be obtained in the constant current control mode, but also achieve both stability in the belt tension through the constant current control and securement of a target motor driving amount. Particularly, the operation control of the seat belt apparatus 10 can significantly enhance the comfort of the vehicle occupant when being restrained by the seat belt during minute seat belt tension adjustment.

It should be appreciated that various constructions, shapes, sizes, positions, etc. explained above in relation to the preferred embodiment are just for illustrative purposes, and that the present invention is not limited to the embodiment described above and may be modified variously without departing from the scope indicated by the appended claims.

The above-described invention can be suitably applied to vehicle seat belt apparatus where tension of the belt is controlled in a constant current control mode, and it can achieve target tension of the belt by changing or adjusting a target value of electric current to be supplied to the motor.

What is claimed is:

1. A vehicle seat belt apparatus comprising:
    a belt reel having a belt wound thereon;
    a motor for driving said belt reel to take up the belt;
    a control device adapted to adjust an amount of electric current supply to said motor to thereby control a belt-taking-up driving force of said motor;
    a current sensor adapted to detect an electric current supplied to said motor; and
    a rotation detection section adapted to detect a rotational position of said belt reel,
    said control device including:
    a constant current control execution section adapted to execute a constant current control mode so that the amount of electric current supply to said motor takes a target value; and
    a target current supply value change section adapted to change the target value when a detection signal output by said rotation detection section has satisfied a predetermined condition in the constant current control mode,
    wherein said target current supply value change section is adapted to change the target value fewer than a predetermined number of times.

2. The vehicle seat belt apparatus according to claim 1, wherein said control device includes a test mode for causing said target current supply value change section to operate in advance by supplying a predetermined level of electric current to said motor.

3. The vehicle seat belt apparatus according to claim 1, wherein said target current supply value change section is adapted to change the target value by a total amount that is less than a predetermined maximum change amount.

4. The vehicle seat belt apparatus according to claim 3, wherein said target current value change section includes a malfunction judgment mode for, when a predetermined condition has been satisfied, judging that said motor is malfunctioning and then setting the target value of the current supply to zero.

5. The vehicle seat belt apparatus according to claim 3, wherein said control device includes a test mode for causing said target current supply value change section to operate in advance by supplying a predetermined level of electric current to said motor.

6. The vehicle seat belt apparatus according to claim 4, wherein said control device includes a test mode for causing said target current supply value change section to operate in advance by supplying a predetermined level of electric current to said motor.

7. The vehicle seat belt apparatus according to claim 1, wherein said target current value change section includes a malfunction judgment mode for, when a predetermined condition has been satisfied, judging that said motor is malfunctioning and then setting the target value of the current supply to zero.

8. The vehicle seat belt apparatus according to claim 7, wherein said control device includes a test mode for causing said target current supply value change section to operate in advance by supplying a predetermined level of electric current to said motor.

9. A vehicle seat belt apparatus comprising:
a belt reel having a belt wound thereon;
a motor for driving said belt reel to take up the belt;
a control device adapted to adjust an amount of electric current supply to said motor to thereby control a belt-taking-up driving force of said motor;
a current sensor adapted to detect an electric current supplied to said motor; and
a rotation detection section adapted to detect a rotational position of said belt reel,
said control device including:
a constant current control execution section adapted to execute a constant current control mode so that the amount of electric current supply to said motor takes a target value; and
a target current supply value change section adapted to change the target value when a detection signal output by said rotation detection section has satisfied a predetermined condition in the constant current control mode,
wherein said target current supply value change section is adapted to change the target value by a total amount that is less than a predetermined maximum change amount.

10. The vehicle seat belt apparatus according to claim 9, wherein said target current value change section includes a malfunction judgment mode for, when a predetermined condition has been satisfied, judging that said motor is malfunctioning and then setting the target value of the current supply to zero.

11. The vehicle seat belt apparatus according to claim 10, wherein said control device includes a test mode for causing said target current supply value change section to operate in advance by supplying a predetermined level of electric current to said motor.

12. The vehicle seat belt apparatus according to claim 9, wherein said control device includes a test mode for causing said target current supply value change section to operate in advance by supplying a predetermined level of electric current to said motor.

13. The vehicle seat belt apparatus according to claim 9, wherein said predetermined maximum change amount is in the range of 1.2 to 1.3 times an initial target value.

14. The vehicle seat belt apparatus according to claim 9, wherein said target current supply value change section is adapted to change the target value in preset increments.

15. A vehicle seat belt apparatus comprising:
a belt reel having a belt wound thereon;
a motor for driving said belt reel to take up the belt;
a control device adapted to adjust an amount of electric current supply to said motor to thereby control a belt-taking-up driving force of said motor;
a current sensor adapted to detect an electric current supplied to said motor; and
a rotation detection section adapted to detect a rotational position of said belt reel,
said control device including:
a constant current control execution section adapted to execute a constant current control mode so that the amount of electric current supply to said motor takes a target value; and
a target current supply value change section adapted to change the target value when a detection signal output by said rotation detection section has satisfied a predetermined condition in the constant current control mode,
wherein said target current value change section includes a malfunction judgment mode for, when a predetermined condition has been satisfied, judging that said motor is malfunctioning and then setting the target value of the current supply to zero.

16. The vehicle seat belt apparatus according to claim 15, wherein said control device includes a test mode for causing said target current supply value change section to operate in advance by supplying a predetermined level of electric current to said motor.

* * * * *